United States Patent [19]

Sato et al.

[11] 4,449,366

[45] May 22, 1984

[54] HYDRAULIC CONTROL SYSTEM FOR OFF-HIGHWAY SELF-PROPELLED WORK MACHINES

[75] Inventors: Hideyori Sato, Funabashi; Mitsuru Arai, Kawasaki, both of Japan

[73] Assignee: Kabushiki Kaisha Komatsu Seisakusho, Tokyo, Japan

[21] Appl. No.: 268,235

[22] Filed: May 29, 1981

[30] Foreign Application Priority Data

May 30, 1980 [JP] Japan ................................ 55-71491
May 30, 1980 [JP] Japan ................................ 55-71492

[51] Int. Cl.$^3$ ................................ F16H 39/46

[52] U.S. Cl. ................................ 60/444; 60/420; 60/452; 60/465

[58] Field of Search ................ 60/420, 444, 452, 462, 60/465, 484, 486

[56] References Cited

U.S. PATENT DOCUMENTS 4,129,987 12/1978 Blume ................................ 60/452
4,199,942 4/1980 Kasper ................................ 60/420

FOREIGN PATENT DOCUMENTS 47-3927 2/1972 Japan .

*Primary Examiner*—Abraham Hershkovitz
*Assistant Examiner*—Richard S. Meyer
*Attorney, Agent, or Firm*—Armstrong, Nikaido, Marmelstein & Kubovcik

[57] ABSTRACT

A hydraulic excavator is disclosed which includes two sets of manual control valves for selectively placing a pair of variable displacement pumps in and out of communication with hydraulically driven components such as propelling motors, arm cylinders and boom cylinders. In order to minimize the per-cycle displacement of the pumps when same are discommunicated from all the driven components, a sensing valve is provided which is pilot operated from the sets of manual control valves. When all the manual control valves are in neutral, the sensing valve directs pressurized fluid from a charging pump to a pump-displacement adjustment mechanism thereby causing same to reduce the per-cycle displacement of the pumps to a minimum.

5 Claims, 9 Drawing Figures

FIG. 4
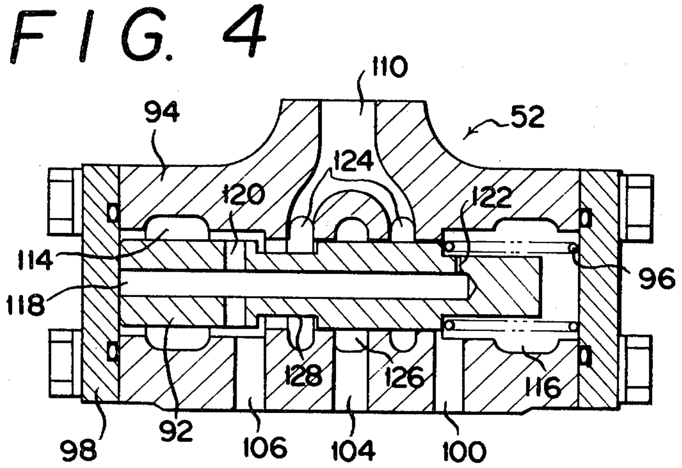
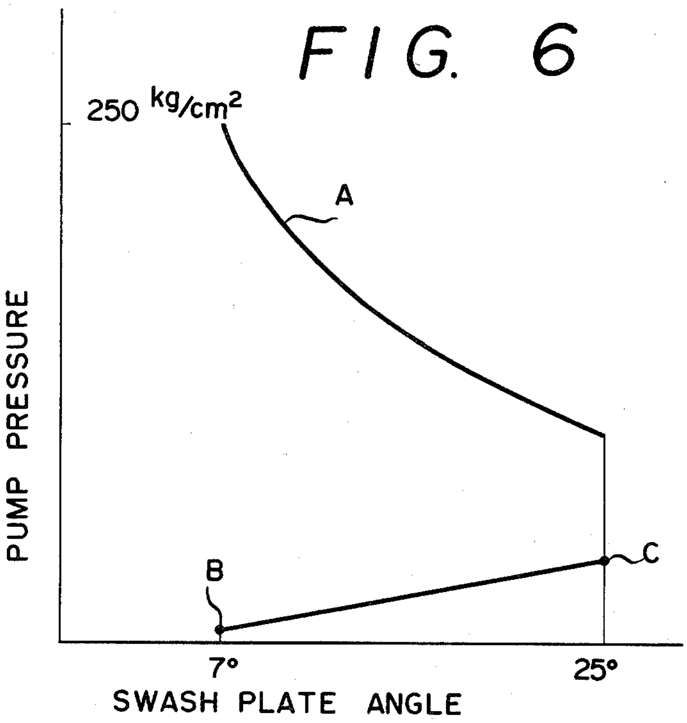

HYDRAULIC CONTROL SYSTEM FOR OFF-HIGHWAY SELF-PROPELLED WORK MACHINES

BACKGROUND OF THE INVENTION

This invention relates to a hydraulic control system for off-highway self-propelled work machines, such as construction and industrial vehicles, of the type having at least one variable displacement pump to be placed in and out of communication with one or more such driven components as a propelling motor and implement actuators. More specifically the invention concerns such a system for automatically controlling the per-cycle displacement of the pump in accordance with whether the pump is in or out of communication with the driven component or components.

A variable-displacement hydraulic pump or pumps are usually incorporated in such off-highway work vehicles as an excavator, which uses hydraulic power for propelling the vehicle, for swivelling the upper frame relative to the undercarriage, and for actuating the implement assembly. The hydraulic system of such work vehicles usually includes a servomechanism, acting on the swash plate of the pump, for maximizing its per-cycle displacement when the load is small. This possesses the disadvantage that the pump displacement is at a maximum even when the pump is out of communication with all the driven components, thus causing considerable waste of energy.

SUMMARY OF THE INVENTION

The present invention seeks to overcome the noted disadvantage of the prior art and to provide an improved hydraulic control system for eliminating wasteful use of energy.

The hydraulic control system of this invention is intended for use with an off-highway self-propelled work machine of the type having at least one variable displacement pump for delivering hydraulic fluid under pressure to at least one hydraulically driven component such as an implement actuator or a propelling motor. The control system includes a manual control valve for selectively placing the pump in and out of communication with the driven component, the control valve being provided with means for producing a fluid pressure signal indicative of whether the pump is in or out of communication with the driven component. Also included is a sensing valve responsive to the fluid pressure signal for directing hydraulic fluid under pressure from a suitable source to a pump-displacement adjustment mechanism when the pump is placed out of communication with the driven component by the manual control valve. The adjustment mechanism on fluid pressure actuation reduces the per-cycle displacement of the pump to a minimum.

In some preferred embodiments disclosed herein, in which the invention is adapted for a hydraulic excavator, the sensing valve is pilot operated from two sets of manual control valves of the three-position neutral-center type for controlling communication between two drive pumps and driven components. The sensing valve directs pressurized fluid from a charging pump to the adjustment mechanism when all the manual control valves are set in neutral.

Preferably, the adjustment mechanism is combined with the usual servo actuator which acts upon the swash plates of the drive pumps for controlling their displacement in accordance with the load imposed thereon. When not actuated, that is, when either drive pump is in communication with at least one of the driven components, the adjustment mechanism allows the servo actuator to control the pump displacement in the usual manner. On actuation the adjustment mechanism minimizes the pump displacement by overriding the servo actuator.

The above and other features and advantages of this invention and the manner of attaining them will become more apparent, and the invention itself will best be understood, from the following description of the preferred embodiments taken in connection with the accompanying drawings.

BRIEF DESCRIPTION OF THE DRAWINGS

FIG. 4 is an enlarged sectional view showing the sensing valve of FIG. 2 in more detail;

FIG. 6 is a graph explanatory of the performance of the control system according to this invention;

DESCRIPTION OF THE PREFERRED EMBODIMENTS

Figure 1:
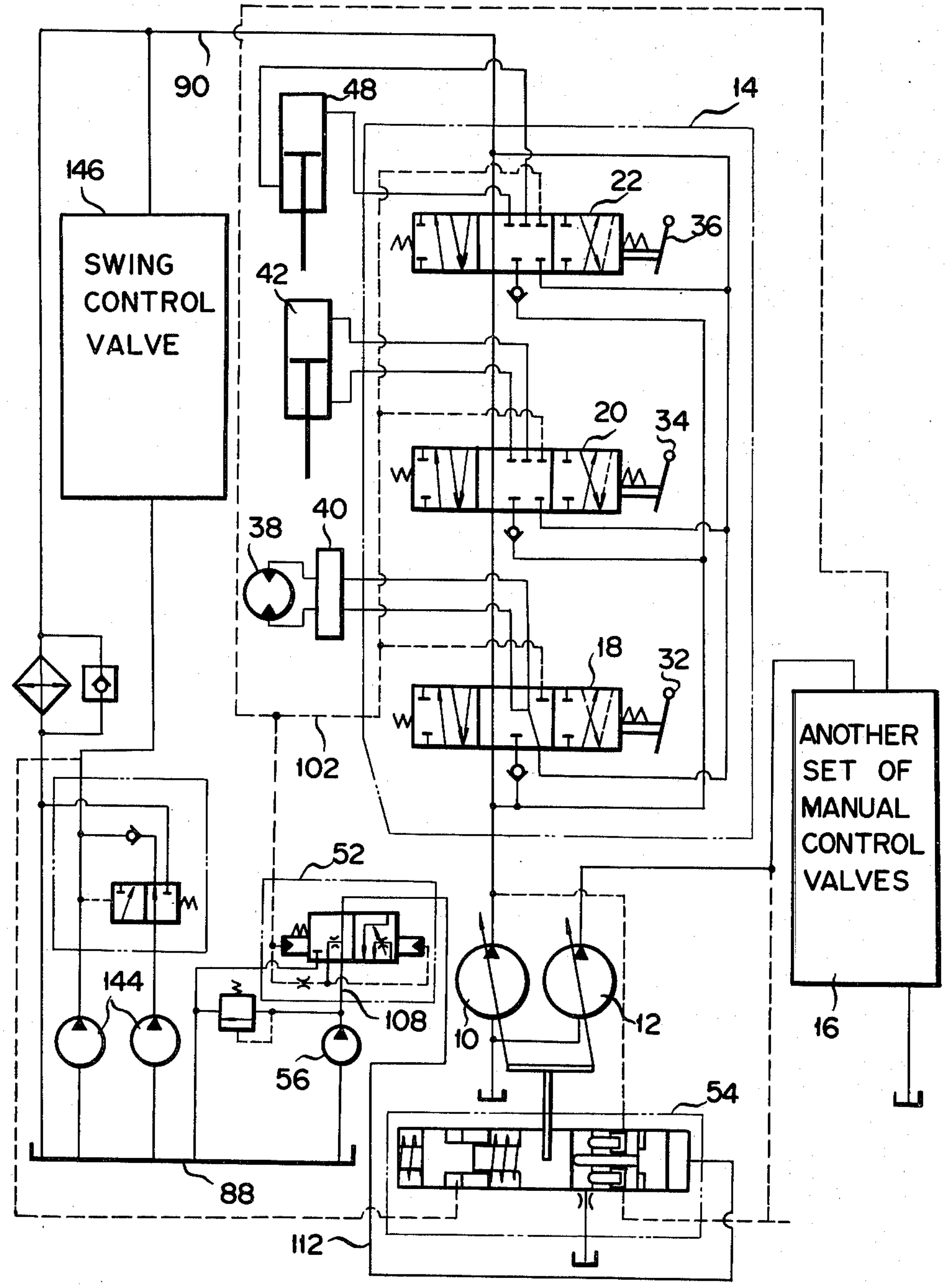
FIG. 1 is a diagram of a hydraulic circuit for a crawler-mounted excavator incorporating the control system of this invention.

The present invention will now be described more specifically as adapted for a hydraulic, crawler-mounted excavator, with reference directed generally to FIGS. 1 through 5. FIG. 1 shows the hydraulic circuit of the exemplified excavator. It includes two variable-displacement drive pumps 10 and 12 for directing hydraulic fluid under pressure to two independent, left and right sets of manual control valves depicted in the rectangular outlines referenced 14 and 16, respectively. Since both sets of manual control valves are essentially identical, only one of them, 14, will be shown and decribed in detail, together with means directly associated therewith.

Figure 2:
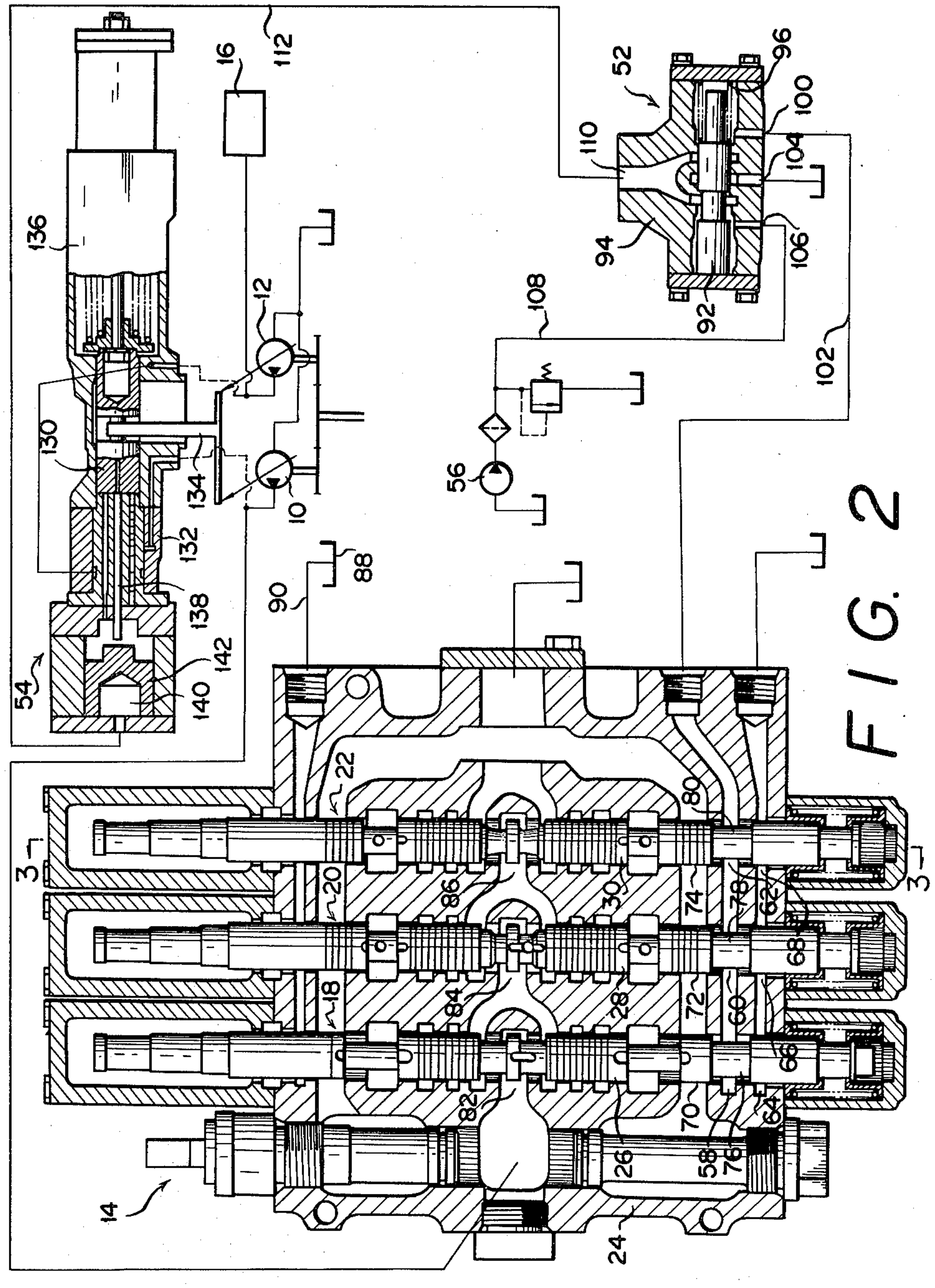
FIG. 2 shows in section one of the manual control valve assemblies, the pilot-operated sensing valve, and the pump-displacement adjustment mechanism in the hydraulic circuit of FIG. 1, together with their connections.
Figure 3:
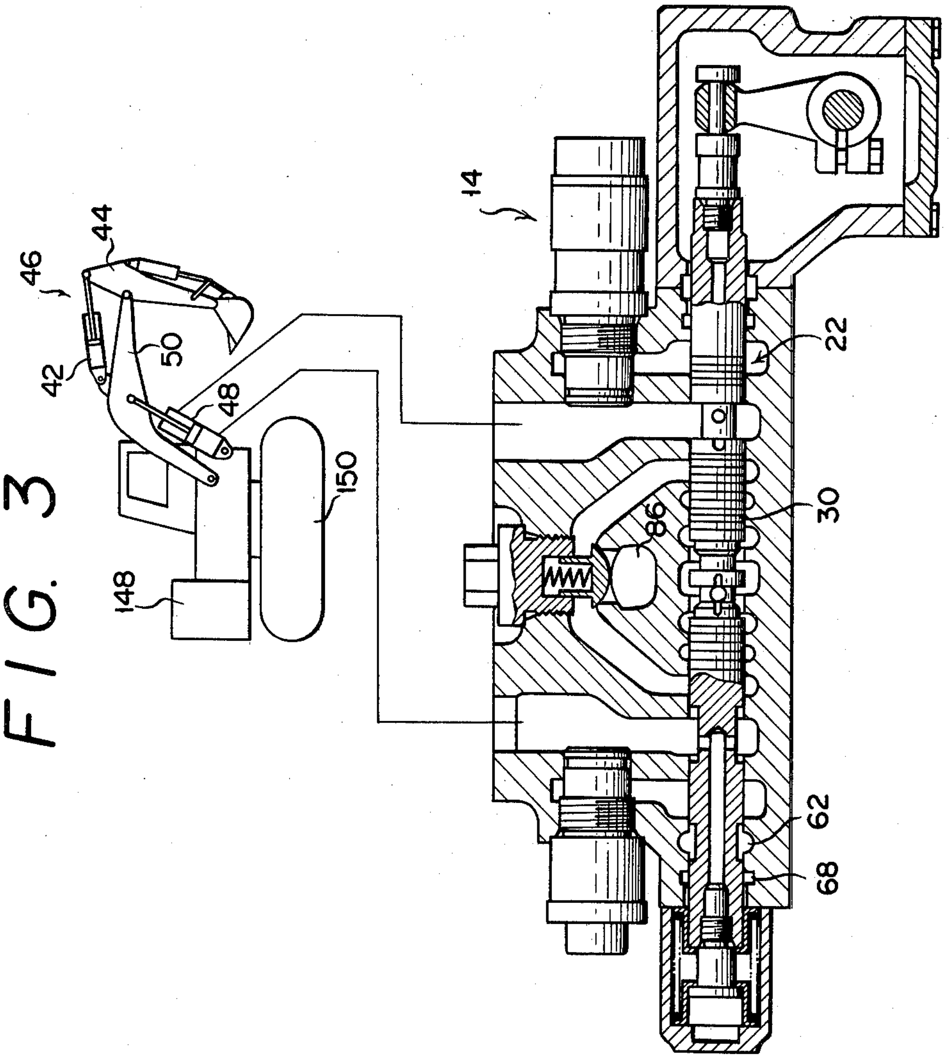
FIG. 3 is a sectional view of the manual control valve assembly taken along the line 3—3 of FIG. 2, shown together with the excavator in which it is incorporated.

As shown in further detail in FIGS. 2 and 3, the representative valve set 14 comprises a steering valve 18, an implement arm control valve 20, and an implement boom control valve 22. All these valves are integrated into a single assembly, sharing a valve housing 24, so that the valve set 14 as a whole could more aptly be called the manual control valve assembly. Of the three-position neutral-center design, the three manual control valves 18, 20 and 22 have their spools 26, 28 and 30 shifted by levers 32, 34 and 36, FIG. 1, respectively. Thus activated, the steering valve 18 controls pump pressure to and away from a bidirectional propelling motor 38 via a counterbalance valve 40. The arm control valve 20 controls pump pressure to and away from an arm cylinder 42 actuating the arm or stick 44, FIG. 3, of the implement assembly 46. The boom control valve 22 controls pump pressure to and away from a boom cylinder 48 actuating the boom 50 of the implement assembly.

With reference to both FIGS. 1 and 2, the hydraulic control system of this invention further comprises a sensing valve 52 pilot-operated from the manual control valve assembly 14 for sensing the fact that the pump 10 is out of communication with all the pump-driven components 38, 42 and 48. Also included is a pump-displacement adjustment mechanism 54 to which the sensing valve 52 directs pressurized fluid from a fixed-displacement charging pump 56 upon discommunication of the drive pump 10 from all the driven components 38, 42 and 48. The adjustment mechanism 54 responds to the fluid pressure by reducing the per-cycle displacement of the drive pump 10, and of the other drive pump 12, to a minimum.

For providing the necessary fluid pressure signal to the sensing valve 52 the manual control valve assembly 14 has an intercommunicated set of pilot ports 58, 60 and 62 and, on its opposite sides, two intercommunicated sets of reservoir ports 64, 66 and 68, and 70, 72 and 74, formed in the valve housing 24. Associated with the respective control valves 18, 20 and 22, the three pilot ports 58, 60 and 62 are out of communication with both sets of reservoir ports 64–68 and 70–74 when all the valve spools 26, 28 and 30 are in neutral central positions as represented in FIG. 2. When any of the control valve spools is shifted to either of the two offset positions, the pilot port set communicates with either set of reservoir ports via the corresponding one of annular grooves 76, 78 and 80 in the spools. Thus the fluid pressure in the intercommunicated set of pilot ports 58, 60 and 62 becomes high when the drive pump 10 is out of communication with all the driven components 38, 42 and 48, and low when the drive pump is in communication with any one or more of the driven components.

Seen at 82, 84 and 86 in FIG. 2 are pump ports of the control valves 18, 20 and 22 respectively. These pump ports intercommunicate when the valve spools 26, 28 and 30 are in neutral, and the pressurized fluid from the drive pump 10 is directed back to the reservoir 88 via conduit 90.

As shown in FIG. 2 and in greater detail in FIG. 4, the pilot-operated sensing valve 52 has a spool 92 reciprocably mounted in a housing 94. A helical compression spring 96 biases the spool 92 into abutment against an end plate 98. The valve housing 94 has formed therein the following four ports:

1. A pilot port 100 in communication with the set of pilot ports 58, 60 and 62 of the manual control valve assembly 14 via conduit 102.

2. A reservoir port 104 in communication with the reservoir 88.

3. A pump port 106 in communication with the charging pump 56 via conduit 108.

4. An outlet port 110 in communication with the pump displacement adjustment mechanism 54 via conduit 112.

The valve housing 94 is recessed annularly at 114, adjacent its end opposite to a spring chamber 116 accommodating the compression spring 96, to provide a pressure chamber in communication with the pump port 106. The spool 92 has a passage 118 formed axaially therein. This axial passage communicates with the pressure chamber 114 via radial passages 120 on one hand and, on the other hand, with the spring chamber 116 via a restricted radial passage 122. The spring chamber 116 is in constant communication with the pilot port 100. The valve housing 94 has further formed therein a pair of annular recesses 124 in direct communication with the outlet port 110, and another similar recess 126 in direct communication with the reservoir port 104. When the spool 92 is in the left hand position under the bias of the compression spring 96 as in FIG. 4, the pump port 106 communicates with the outlet port 110 by way of annular groove 128 in the spool and one of the recesses 124. On rightward displacement against the bias of the compression spring 96 the spool 92 discommunicates the pump port 106 from the outlet port 110 and places the outlet port in communication with the reservoir port 104 via the groove 128 therein and the recess 126.

Figure 5:
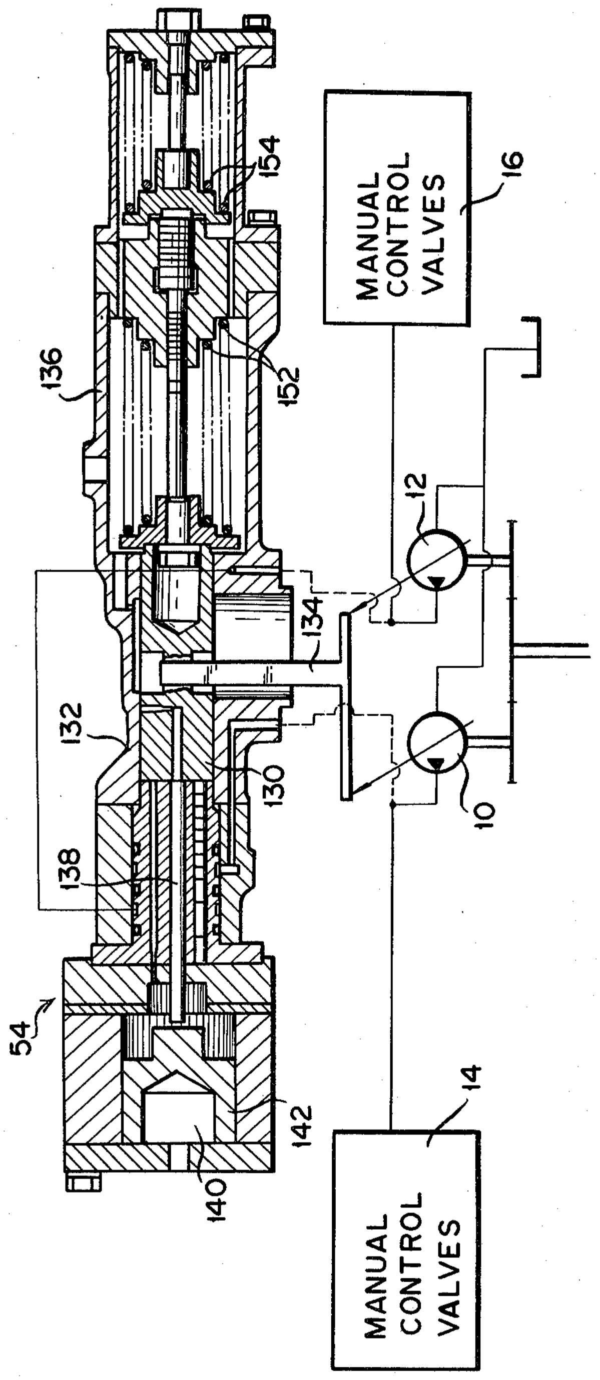
FIG. 5 is an enlarged sectional view showing the adjustment mechanism and servo actuator of FIG. 2 in more detail.

FIG. 5 best illustrates the construction of the pump displacement adjustment mechanism 54, which sets the per-cycle displacement of the drive pumps 10 and 12 at a minimum or maximum in response to the fluid signal from the sensing valve 52. Included in this adjustment mechanism is a piston 130 reciprocably mounted within a cylinder 132 and coupled to the swash plates of the drive pumps 10 and 12 via linkage 134. The piston 130 has one of its ends coupled to a servo actuator 136 of any known or suitable design which controls the per-cycle displacement of the drive pumps 10 and 12 in accordance with the load imposed thereon. A rod 138 extending from the other end of the piston 130 projects into a pressure chamber 140 in which there is reciprocably mounted another piston 142. As will be noted from FIG. 2, the pressure chamber 140 communicates with the outlet port 110 of the sensing valve 52 via the conduit 112. Consequently, upon delivery of the pressurized fluid from the sensing valve 52 into the pressure chamber 140 of the adjustment mechanism 54, the piston 142 in the chamber acts on the rod 138 to cause the other piston 130 to travel in such a direction as to reduce the per-cycle displacement of the drive pumps 10 and 12.

Seen at 144 in FIG. 1 are a pair of fixed displacement pumps for the delivery of hydraulic fluid under pressure to a swing motor, not shown, via a swing control valve 146. As is well known, the swing motor functions to cause swivelling motion of the upper frame 148, FIG. 3, as well as the implement assembly 46 relative to the track undercarriage 150.

In operation, let it be assumed that any one or more of the valves 18, 20 and 22 of the manual control valve assembly 14, or of the other similar valve assembly 16 are now actuated to either of the offset positions. Then the groove 76, 78 or 80 in the spool 26, 28 or 30 of the actuated control valve permits communication of the intercommunicated set of pilot ports 58, 60 or 62 with either of the two intercommunicated sets of reservoir ports 64–68 and 70–74. Thus the pressurized fluid fed from the charging pump 56 to the sensing valve 52 flows through the pump port 106, radial passages 120, axial passage 118, restriction 122, spring chamber 116 and pilot port 100, out into the conduit 102 leading to the pilot ports 58, 60 and 62 of the manual control valve assembly 14 or 16. Since the pilot ports of the manual control valve assembly are now in communication with either set of reservoir ports 64–68 or 70–74, the pressurized fluid from the charging pump 56 is drained.

In flowing through the restriction 122 from the spool passage 118 to spring chamber 116 of the sensing valve 52, the fluid encounters resistance to such an extent as to create a substantial pressure differential between spool passage 118 and spring chamber 116. The pressure differential causes the spool 92 to travel rightwardly, as viewed in FIG. 2 or 4, against the bias of the compression spring 96. Thereupon the spool 92 blocks communication between pump port 106 and outlet port 110 and, instead, places the outlet port in communication with the reservoir port 104.

Thus communicated with the fluid drain, the pressure chamber 140 of the pump-displacement adjustment mechanism 54 permits the piston 130 within the cylinder 132 to be acted upon as required by the springs 152 and 154 of the servo actuator 136. Consequently the servo actuator can operate in the know manner to adjust the angular position of the swash plates of the drive pumps 10 and 12 in accordance with the load thereon, without being hampered by the adjustment mechanism 54. The curve A in the graph of FIG. 6 represents the known performance of the servo actuator, indicating a decrease in the per-cycle displacement of each pump with an increase in load.

The following is the discussion of the way in which the control system of this invention operates when all the valves 18, 20 and 22 of the manual control valve assemblies 14 and 16 are neutralized, as in the event of a temporary suspension in the operation of the excavator. Since then the pilot ports 58, 60 and 62 of the manual control valves 18, 20 and 22 are all discommunicated from both sets of reservoir ports 64–68 and 70–74, the pressurized fluid from the charging pump 56 is no longer drained, and the fluid pressure in the spring chamber 116 of the sensing valve 52 becomes equal to that in the pressure chamber 114. Under the bias of the compression spring 96, therefore, the sensing valve spool 92 travels leftwardly to place the pump port 106 in communication with the outlet port 110, thereby permitting the charging pump 56 to deliver the pressurized fluid to the adjustment mechanism 54.

Upon consequent introduction of the pressurized fluid into the pressure chamber 140 of the adjustment mechanism 54, the piston 142 therein moves rightwardly, as viewed in FIGS. 2 and 5, to cause, via the rod 138, the other piston 130 to travel in the same direction against the forces of the servo actuator springs 152 and 154, to such a position as to minimize the per-cycle displacement of the drive pumps 10 and 12. Experiment has proved that pump pressure loss when all the manual control valves are in neutral can be reduced by this invention to the point B in the graph of FIG. 6, compared with the point C in accordance with the prior art.

Figure 7:
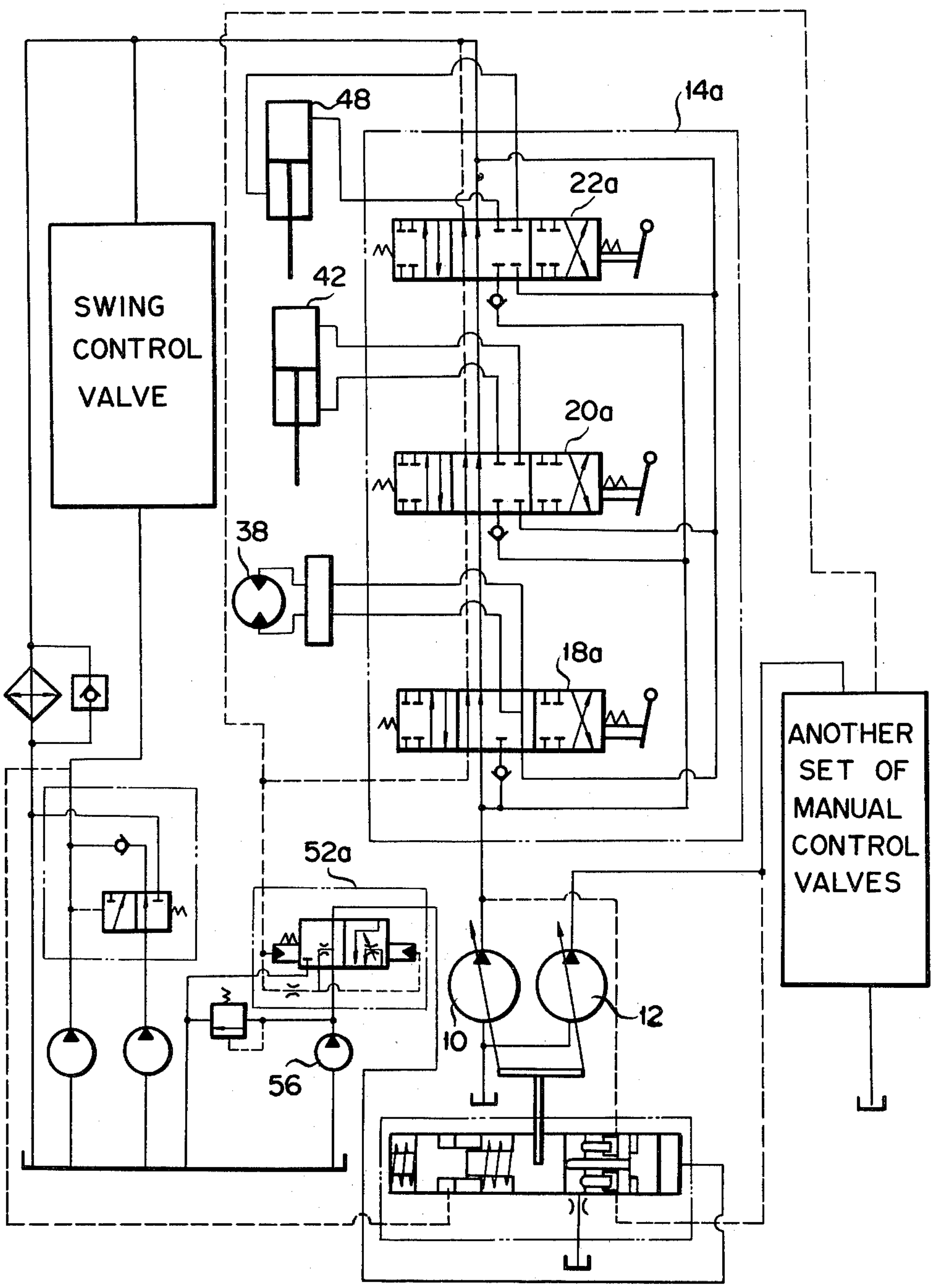
FIG. 7 is a diagram corresponding to FIG. 1 but showing another preferred embodiment of the invention.
Figure 8:
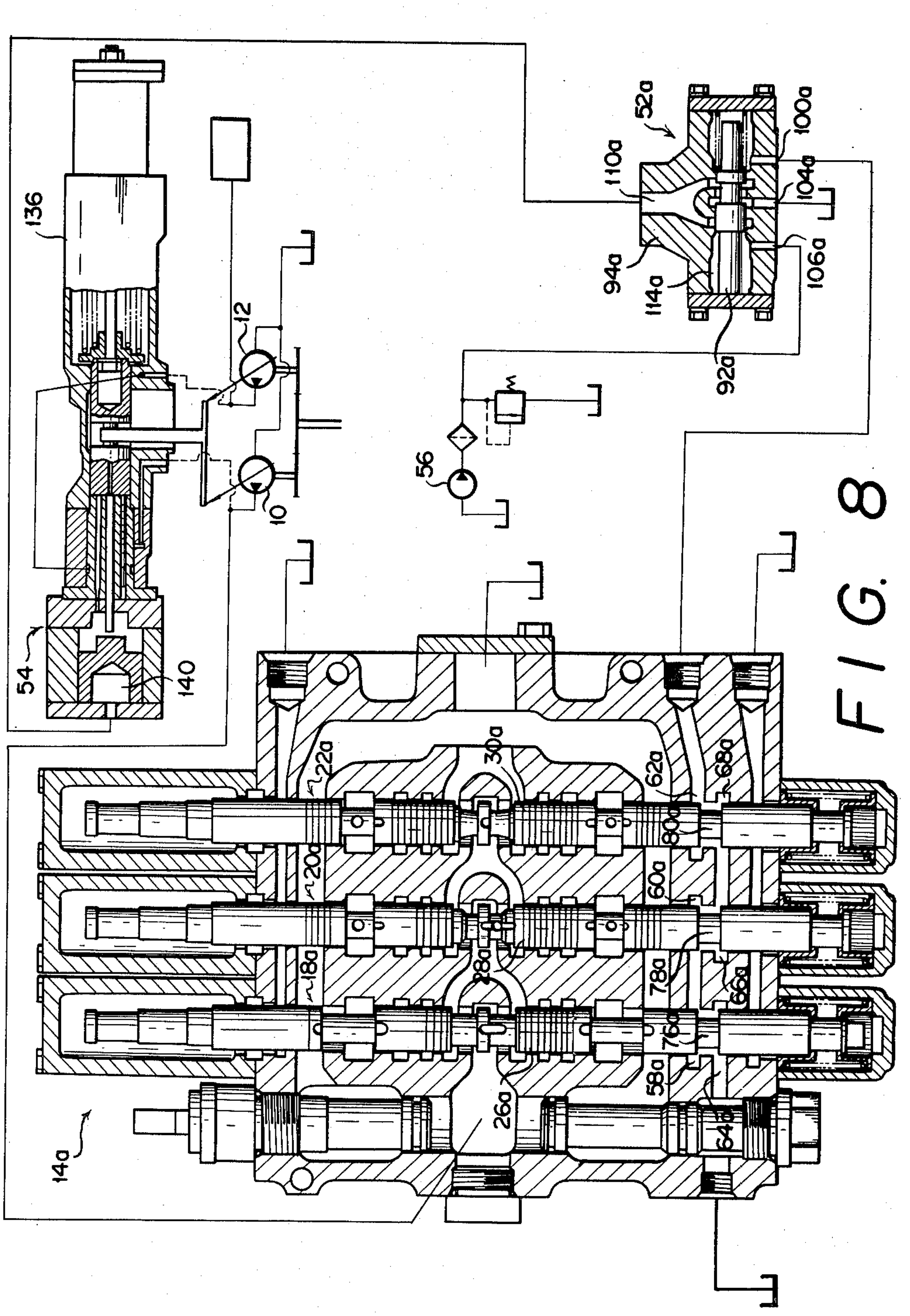
FIG. 8 is a view corresponding to FIG. 2 but showing the modified manual control valve assembly and sensing valve in the embodiment of FIG. 7.
Figure 9:
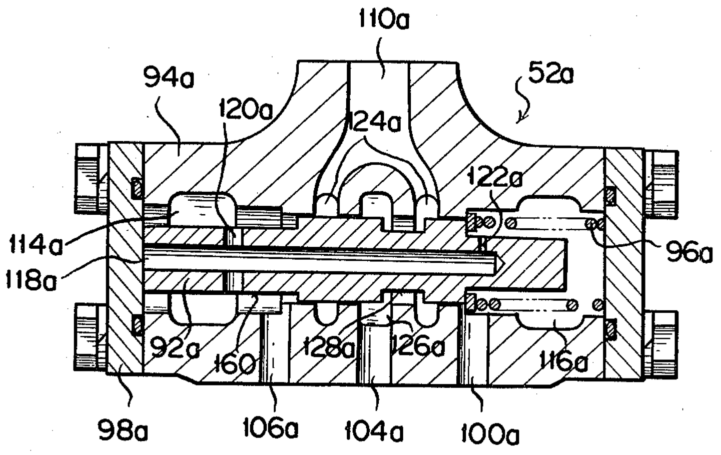
FIG. 9 is an enlarged sectional view showing the modified sensing valve of FIG. 8 in further detail.

FIGS. 7, 8 and 9 illustrate another preferred embodiment of the invention which, in fact, is only a slight modification of the preceding embodiment. As will be noted from FIG. 7, the modified hydraulic system for an excavator is generally identical in configuration with that shown in FIG. 1. The modification resides in the way in which a sensing valve 52*a* is pilot operated from a manual control valve assembly 14*a* for sensing the discommunication of the drive pump 10 from all the driven components 38, 42 and 48.

As best shown in FIG. 8, the modified manual control valve assembly 14*a* has three pilot ports 58*a*, 60*a* and 62*a* and three reservoir ports 64*a*, 66*a* and 68*a*, associated with the respective manual control valves 18*a*, 20*a* and 22*a*. The pilot ports 58*a*, 60*a* and 62*a* communicate with the reservoir ports 64*a*, 66*a* and 68*a* via spool grooves 76*a*, 78*a* and 80*a* when the spools 26*a*, 28*a* and 30*a* of all the manual control valves are in neutral, as in this figure. Upon displacement of any one of the valve spools 26*a*, 28*a* and 30*a* to either of the two offset positions, the pilot port associated with the displaced spool becomes discommunicated from the corresponding reservoir port, resulting in the closure of the pilot line leading to the sensing valve 52*a*.

Reference is now directed to FIG. 9 in order to describe the construction of the modified sensing valve 52*a*. It includes a spool 92*a* reciprocably mounted in a housing 94*a* and normally held against an end plate 98*a* by a compression spring 96*a* in a spring chamber 116*a*. The valve housing 94*a* has the following four ports:

1. A pilot port 100*a* in communication, on one hand, with the set of pilot ports 58*a*, 60*a* and 62*a* of the manual control valve assembly 14*a* and, on the other hand, with the spring chamber 116*a* of the sensing valve 52*a*.

2. A reservoir port 104*a* in communication with the reservoir.

3. A pump port 106*a* in communication, on one hand, with the charging pump 56 and, on the other hand, with the pressure chamber 114*a* surrounding the spool 92*a*.

4. An outlet port 110*a* in communication with the pump displacement adjustment mechanism 54.

As in the sensing valve 52 of the preceding embodiment an axial passage 118*a* in the spool 92*a* communicates with the pressure chamber 114*a* via radial passages 120*a* and with the spring chamber 116*a* via a restriction 122*a*. The spool 92*a* when in the illustrated left hand position communicates the outlet port 110*a* with the reservoir port 104*a* via one of a pair of annular recesses 124*a*, a groove 128*a* in the spool, and another annular recess 126*a*. On rightward displacement the spool 92*a* communicates the outlet port 110*a* with the pump port 106*a* via the other of the pair of annular recesses 124*a* and another groove 160 in the spool.

The other details of construction of this modified control system are as set forth above in connection with the preceding embodiment, so that no description of such details will be given. In the following description of operation some parts and components of the second embodiment will be referred to by the same numerals as used to denote the corresponding parts and components of the first embodiment.

When any of the manual control valves 18*a*, 20*a* and 22*a* is activated to place the drive pump 10 in communication with one of the driven components 38, 42 and 48, the displaced spool of that valve discommunicates the corresponding one of the pilot ports 58*a*, 60*a* and 62*a* from the corresponding one of the reservoir ports 64*a*, 66*a* and 68*a*. With the pilot line of the sensing valve 52*a* thus blocked, fluid pressures become equal in the pressure chamber 114*a* and spring chamber 116*a* of the sensing valve. Thereupon the compression spring 96*a* urges the spool 92*a* into abutment against the end plate 98*a*, resulting in the communication of the outlet port 110*a* with the reservoir port 104*a* via the spool groove 128*a*. Since then the pressure chamber 140 of the adjustment mechanism 54 is drained of pressurized fluid, the adjustment mechanism allows the servo actuator 136 to control the per-cycle displacement of the drive pumps 10 and 12 in accordance with the load thereon.

When all the manual control valves are returned to the neutral central positions during the operation of the excavator, the pilot ports 58a, 60a and 62a communicate with the reservoir ports 64a, 66a and 68a. With the pilot line of the sensing valve 52a thus communicated with the fluid drain, the pressurized fluid from the charging pump 56 starts flowing out of the port 100a by way of the pump port 106a, spool passages 120a and 118a and restriction 122a, and spring chamber 116a. The spool 92a travels rightwardly against the bias of the compression spring 96a owing to the pressure differential created between spool passage 118a and spring chamber 116a as the pressurized fluid passes the restriction 122a.

The rightward displacement of the spool 92a results in the discommunication of the outlet port 110a from the reservoir port 104a and in the communication of the outlet port with the pump port 106a. Thus the pressurized fluid from the charging pump 56 is directed to the adjustment mechanism 54 to cause the same to reduce the per-cycle displacement of the drive pumps 10 and 12 to a minimum.

According to this alternative embodiment the pilot circuit for the activation of the sensing valve is blocked from the fluid drain when at least one of the manual control valves is actuated to place the drive pump in communication with one of the driven components, in contrast to the preceding embodiment wherein the pilot circuit is held closed when no manual control valve is actuated. The manual control valves of each assembly are in series connection, so that the laps of the valves can be made sufficiently long to minimize fluid leakage from the pilot circuit, except for leakage from the actuated valve. Thus, even if the restricted passage in the spool of the sensing valve is reduced to a minimum in diameter, the sensing valve will not be shifted through fluid leakage. Such reduction in the diameter of the restriction is preferred in view of the smaller amount of fluid that must be fed into the pilot circuit.

Although the hydraulic control system according to this invention has been shown and described hereinbefore in connection with two drive pumps each driving three components via respective manual control valves, it is recognized that the inventive system lends itself to use with one such pump driving one component. It is also understood that the inventive system finds application to hydraulic work machines other than excavators.

What we claimed is:

1. A hydraulic control system for an off-highway self-propelled work machine of the type having at least one variable displacement pump for delivering hydraulic fluid under pressure to at least one hydraulically driven component such as an implement actuator or a propelling motor, the control system comprising:

(a) a hydraulically actuated adjustment mechanism for reducing the per-cycle displacement of said pump to a minimum on actuation;

(b) at least one manual control valve for selectively placing said pump in and out of communication with said driven component;

(c) means provided to said manual control valve for producing a fluid pressure signal indicative of whether said pump is in or out of communication with said driven component;

(d) an additional source of fluid under pressure;

(e) a sensing valve responsive to the fluid pressure signal for directing the pressurized fluid from said additional source to said adjustment mechanism when said pump is placed out of communication with said driven component by said manual control valve;

(f) said signal producing means comprising a pilot port in communication with said additional pressurized fluid source via said sensing valve and a reservoir port placed in and out of communication with said pilot port depending upon whether said pump is in or out of communication with said driven components.

2. A hydraulic control system according to claim 1, wherein the pilot port is communicated with the reservoir port when the pump is in communication with the driven component, and wherein the sensing valve is adapted to direct the pressurized fluid from the additional source to the adjustment mechanism upon discommunication of the pilot port from the reservoir port.

3. A hydraulic control system according to claim 1, wherein the pilot port is communicated with the reservoir port when the pump is out of communication with the driven component, and wherein the sensing valve is adapted to direct the pressurized fluid from the additional source to the adjustment mechanism upon communication of the pilot port with the reservoir port.

4. An off-highway self-propelled work machine comprising:

(a) at least one variable displacement pump;

(b) a hydraulically actuated adjustment mechanism for reducing the per-cycle displacement of said pump to a minumum on actuation;

(c) a plurality of hydraulically driven components;

(d) a set of manual control valves, each for selectively placing said pump in and out of communication with one of said driven components;

(e) means provided to said set of manual control valves for producing a fluid pressure signal indicative of whether said pump is in or out of communication with at least one of the driven components;

(f) an additional source of fluid under pressure;

(g) a sensing valve responsive to said fluid pressure signal for directing the pressurized fluid from said additional source to said adjustment mechanism when said pump is placed out of communication with all the driven components by said manual control valves; and (h) said fluid pressure signal producing means comprising a plurality of pilot ports provided one to each manual control valve and communicating with said additional pressurized fluid source via said sensing valve and at least one set of reservoir ports provided one to each manual control valve and each placed in and out of communication with a corresponding one of the pilot ports depending upon whether the pump is in or out of communication with a corresponding one of the driven components.

5. An off-highway self-propelled work machine according to claim 4, further comprising a servo actuator for controlling the per-cycle displacement of the pump in accordance with load imposed thereon, when the adjustment mechanism is not actuated.

* * * * *